L. L. LESOINE.
EMERGENCY BRAKE FOR AUTOMOBILES.
APPLICATION FILED JUNE 22, 1910.
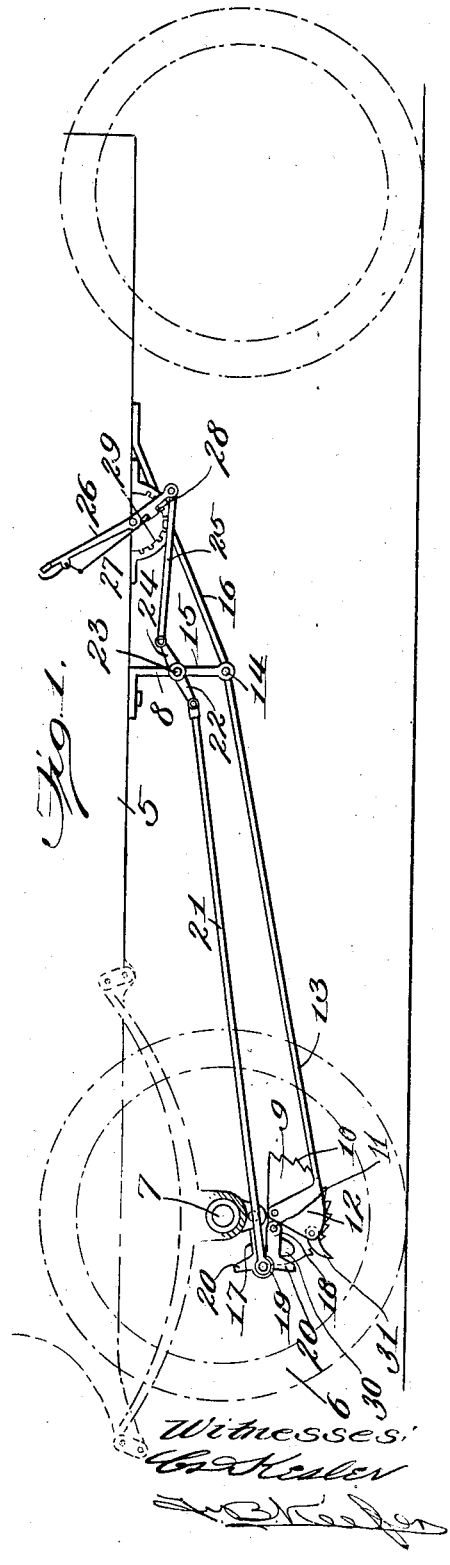
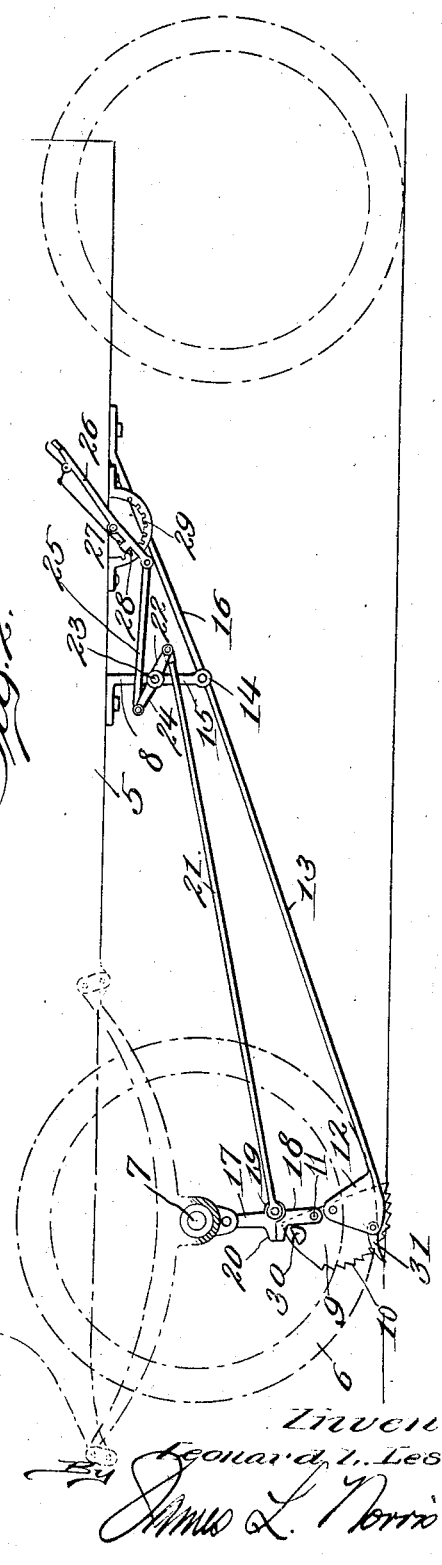

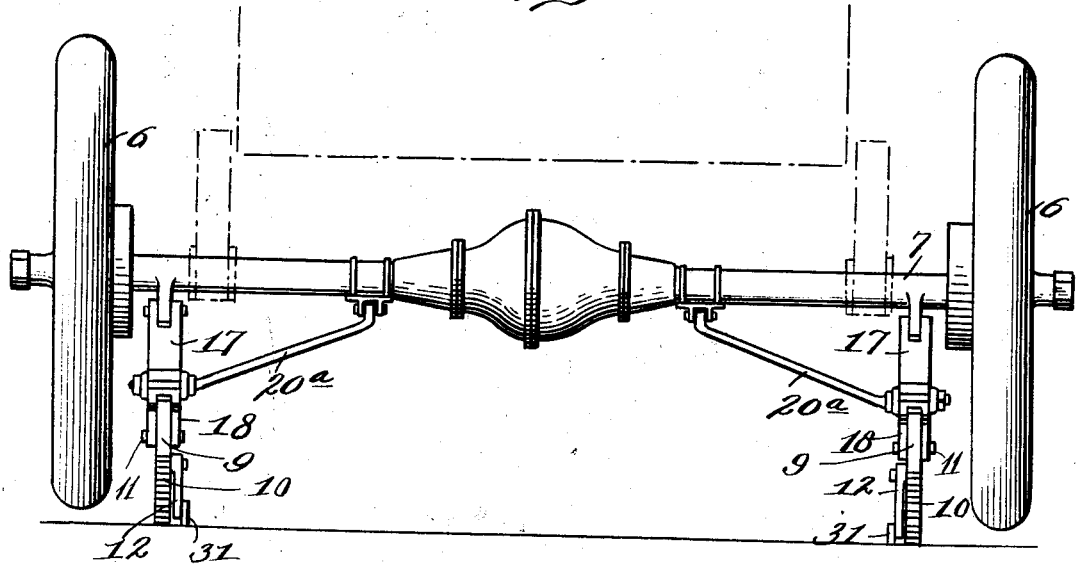
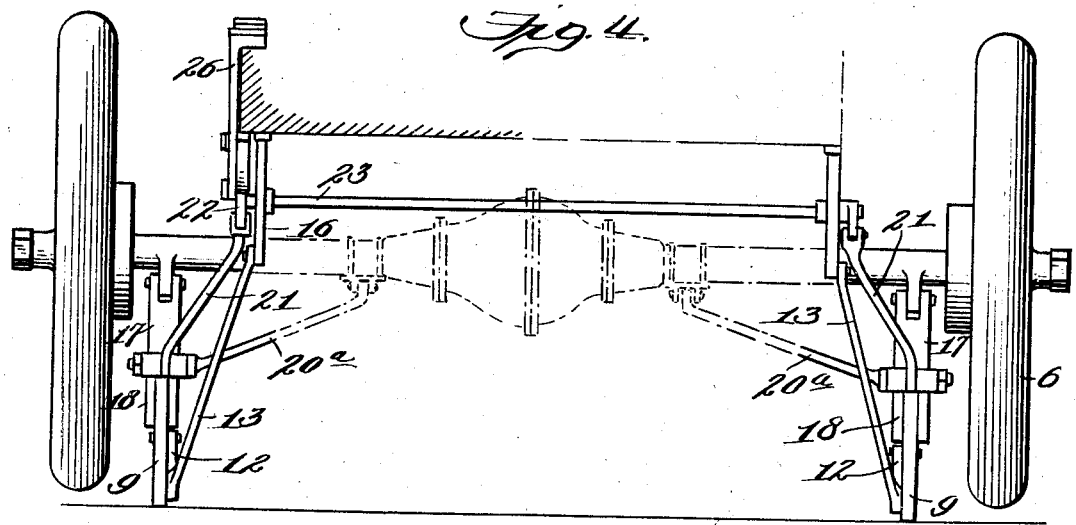

UNITED STATES PATENT OFFICE.

LEONARD L. LESOINE, OF EAST STROUDSBURG, PENNSYLVANIA.

EMERGENCY-BRAKE FOR AUTOMOBILES.

994,263.   Specification of Letters Patent.   Patented June 6, 1911.

Application filed June 22, 1910. Serial No. 568,323.

*To all whom it may concern:*

Be it known that I, LEONARD L. LESOINE, a citizen of the United States, residing at East Stroudsburg, in the county of Monroe and State of Pennsylvania, have invented new and useful Improvements in Emergency-Brakes for Automobiles, of which the following is a specification.

This invention relates to an emergency brake for automobiles and other vehicles, and the primary object of the same is to provide simple and efficient means whereby, in case there is possibility of an accident or for other reasons, the progress of an automobile may be quickly checked by raising the driving wheels of the vehicle from the ground and thus permit the engine or motor to rotate the driving axle and wheels of the vehicle without resulting in a propulsion of the latter.

A further object of the invention is to provide an emergency brake for automobiles having an automatic operation when released and positive in its action in stopping the vehicle much more quickly and readily than can be accomplished by the brakes as ordinarily constructed and without necessitating a stoppage of the motor or engine, and also operable with equal effect on levels and grades.

With these and other objects and advantages in view the invention consists in the construction and arrangement of the several parts which will be more fully hereinafter specified.

In the drawing: Figure 1 is a side elevation of the improved emergency brake shown applied to an automobile illustrated in part in dotted lines, the brake mechanism being shown in raised or inoperative position. Fig. 2 is a view similar to Fig. 1 showing the brake mechanism lowered into operative position. Fig. 3 is a rear end elevation of the running gear of an automobile showing the manner of applying the rear portion of the auxiliary brake. Fig. 4 is a front end elevation of the running gear of an automobile showing the manner of applying the front portion of the auxiliary brake.

The numeral 5 designates an automobile of any preferred construction and embodying the usual bed or frame and rear driving wheels 6. Suspended from the axle 7 adjacent to each driving wheel 6 and in part held by a bracket 8 secured to the underside of the forward portion of the body or frame of the automobile, is the improved emergency brake which consists essentially of a semicircular traction disk 9 having teeth 10 extending over a portion of the periphery of the same, the said disk being eccentrically fulcrumed at 11 to a depressing means which will be presently explained. The upper part of a segmental supporting plate 12 is movably attached to the disk 9 and has a rod 13 rigidly secured to its lower portion and extending forwardly and movably connected to the lower end 14 of the vertical member 15 of the bracket 8. An inclined brace 16 is also rigidly connected to the lower end 14 of the member 15 of the bracket 8 and extends upwardly to the bed or frame of the machine and is rigidly secured to the latter.

The traction disk 9 is movably suspended from or connected to the axle 7 through the medium of a compound link comprising an upper member 17 and a lower member 18, the upper member 17 having one end movably secured to the bearing 7 and the opposite end movably attached by means of a rule joint 19 to the adjacent end of the member 18, both members 17 and 18 adjacent to the rule joint 19 having contact projections or stops 20 extending outwardly at an angle therefrom and coming into engagement when the compound link is drawn forward to depress the traction disk 9, joint 19 being reinforced by a brace 20ª therefrom to the axle. The end of the member 18 of the compound link opposite that connected to the member 17 has the fulcrum 11 of the disk 9 secured thereto so as to operate to turn the said disk in opposite directions when the disk is lowered to engage the ground surface and operate to perform its function and when elevated into inoperative position. The supporting segment 12 and rod 13 swing in the arc of a circle relatively to the lower end of the vertical member 15 of the bracket 8, and the disk 9 is depressed and elevated equally with the supporting segment and is partially rotatable on the segment.

Movably attached to the rule joint 19 of the compound link is a connecting rod 21 which extends forwardly and is movably attached to one crank arm 22 projecting from a rock-shaft 23 movably mounted on the central portion of the vertical member 15 of the bracket 8. It will be understood that the bracket 8 is duplicated at opposite sides of the bed or frame of the machine and also the mechanism including the traction disk 9 thus far described, and the two extremities of the rock-shaft are movably held in the vertical members of the brackets and operable through the medium of a crank-arm 24 projecting therefrom in a direction opposite to the direction of the crank-arm 22. In other words, the traction disks are duplicated on opposite sides of the machine and the connecting mechanism between the said disks and the crank shaft 23 is likewise duplicated, or is similar on both sides of the machine. A link 25 is movably attached to the crank-arm 24 and also to the lower end of a foot-treadle 26 intermediately fulcrumed in the bed of the machine as shown, and having a draw latch or dog mechanism 27 connected thereto with an upper free end adjacent to the foot engaging end of the treadle so as to operate a latch or dog 28 relatively to a toothed segment 29 to lock the emergency brake mechanism in either one of its two positions, as shown by Figs. 1 and 2.

The traction disk 9 has a lug or projection 30 thereon to engage the adjacent edge of the member 18 of the compound link to limit the movement of the said traction disk when raised and lowered and particularly when lowered in operative position and the teeth 10 are forced into engagement with the ground surface and the disk thrown over in a forward direction to the predetermined limit of its movement to effect an elevation of the adjacent drive wheel from the ground surface.

Projecting rearwardly from each segmental support 12 and also extending downwardly from the latter is a spike or tooth 31 which comes into play when the traction disk 9 is lowered into operative position on an upgrade to prevent any backward movement of the machine, the spike under such conditions becoming partially embedded in the ground surface and serving as a chuck.

It will be understood that the traction disks 9 on opposite sides of the machine are simultaneously operated either to raise or lower the same and are both provided with similar mechanism for rendering them active and inactive.

The movable attachment of the upper portion of the segmental supporting plate 12 to each disk 9 accommodates solely the changes of position of the disk and the rising and falling movement of the segmental plate in elevating the disk 9 above and throwing said disk downwardly toward the ground surface on the working fulcrum 11 and provides for the performance of the function of the segmental plate 12 and the parts connected thereto without impeding movement of the disk 9 or obstructing the latter in its function when thrown down and having a slight turning movement imparted thereto toward the rear to elevate the wheels 6. The disk 9, plate 12 and link members 17 and 18 unitedly move downwardly and upwardly in the operation of the improved device through the fulcrum means between the upper end of the said link member 17 and the bearing 7.

From the foregoing the operation of the mechanism will be understood and it will be seen that a forward pressure exerted on the treadle 26 will actuate the rock-shaft 23 and draw the connecting rod 21 in a forward direction and simultaneously elongate the compound link and bring the projections 20 of the latter together, the elongation of the compound link causing the traction disk 9 at each side to be depressed and also slightly turn in a forward direction so as to bring the traction disks in proper position relatively to the ground surface and instantly the drive wheels 6 are elevated and the impetus of the machine is checked. In the operation of the mechanism both disks are simultaneously lowered and raised through the medium of the similar mechanism connecting the disks with the rock shaft 23, and therefore the brake will be applied equally on both sides of the machine. After the emergency brake has served its function it may be restored to normal position as shown by Fig. 1.

It will be understood that the improved emergency brake will be used only occasionally or to avert accident and that under ordinary conditions the usual form of brake will be employed to check the forward movement of the machine.

It is obvious that changes in the proportions, dimensions and minor details may be resorted to without departing from the spirit of the invention.

What is claimed is:

1. In a device of the class specified, the combination with a vehicle having drive wheels, of depressible toothed traction disks having a partial rotating movement, depressing means eccentrically pivoted to the disks, rearwardly projecting means to prevent backward movement of the vehicle when on an upgrade, and means for elevating the said disks and rearwardly projecting them into inoperative position, the disks having their partial rotation independently of the movement of said means.

2. In a device of the class specified, the combination with a vehicle having driving wheels, of emergency brake organizations movably suspended from points near the axle of said wheels and consisting of swinging supporting devices, toothed traction disks movably held by parts of said swinging supporting devices, compound links having members thereof eccentrically connected to the traction disks and intermediately pivoted, operating means connected to the pivoted portions of the links, and mechanism for lowering and raising the supporting devices and disks and for exerting a drawing and a pushing action on the said operating means to open and close the links, the disks having a partial rotating movement independently of the movement of the said mechanism.

3. In a device of the class specified, the combination with a vehicle having drive wheels, of emergency brake organizations consisting of toothed traction disks, intermediately pivoted links having members eccentrically connected to said disks, and means connected to the pivoted portions of the links for opening and closing the latter and depressing and elevating the disks, the disks having a partial rotating movement independently of the movement of said means.

4. In a device of the class specified, the combination with a vehicle having driving wheels, of emergency brake organizations coöperating with each wheel to elevate the same from the ground surface and consisting of vertically movable toothed traction disks, supporting devices in which said traction disks are pivotally mounted, the supporting devices having a swinging movement, brackets to which the supporting devices are movably attached, a rock-shaft held by the brackets and provided with crank-arms, compound links intermediately pivoted and movably attached to portions of the bearings for the axle of the driving wheels and eccentrically connected to the said traction disks and operating by their opening and closing movements to respectively depress and elevate the traction disks and supporting devices, the disks having a partial rotation during the swinging movement of the supporting devices, connecting rods movably attached to a part of the crank-arms of the rock-shaft and to the intermediate pivoted portions of the links, and operating means also attached to the remaining arms of the rock-shaft.

In testimony whereof I have hereunto set my hand in presence of two subscribing witnesses.

LEONARD L. LESOINE.

Witnesses:
WM. H. EVANS,
C. W. HOWD.

---

Copies of this patent may be obtained for five cents each, by addressing the "Commissioner of Patents, Washington, D. C."